United States Patent
Kawamoto (10) Patent No.: US 6,314,295 B1
(45) Date of Patent: *Nov. 6, 2001

(54) TERMINAL UNIT, POSITION DISPLAY METHOD, INFORMATION PROVIDING SYSTEM, AND INFORMATION PROVIDING METHOD

(75) Inventor: Yoji Kawamoto, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/771,146

(22) Filed: Dec. 20, 1996

(30) Foreign Application Priority Data

Dec. 27, 1995 (JP) .................................... 7-340263

(51) Int. Cl.$^7$ .................................................. H04Q 7/20
(52) U.S. Cl. .............................................. 455/456; 455/457
(58) Field of Search ........................... 455/427, 456, 455/457, 422, 450, 404, 405, 406, 407, 408, 555; 342/357, 457, 450, 357.13; 340/988, 905, 990, 995, 705.49; 701/208, 213, 200, 201; 379/35

(56) References Cited

U.S. PATENT DOCUMENTS

| | | | | |
|---|---|---|---|---|
| 5,043,736 | * | 8/1991 | Darnell et al. | 455/456 |
| 5,131,020 | * | 7/1992 | Liebesny et al. | 455/422 |
| 5,218,367 | * | 6/1993 | Sheffer et al. | 455/457 |
| 5,353,034 | * | 10/1994 | Sato et al. | 342/457 |
| 5,502,758 | * | 3/1996 | Tsuzuki et al. | 455/457 |
| 5,542,100 | * | 7/1996 | Hatakeyama | 340/990 |
| 5,548,822 | * | 8/1996 | Yogo | 455/457 |
| 5,564,079 | * | 10/1996 | Olsson | 455/67.1 |
| 5,600,706 | * | 2/1997 | Dunn et al. | 455/456 |
| 5,625,668 | * | 4/1997 | Loomis et al. | 455/456 |
| 5,627,547 | * | 5/1997 | Ramaswami et al. | 342/357 |
| 5,635,940 | * | 6/1997 | Hickman et al. | 342/389 |
| 5,666,662 | * | 9/1997 | Shibuya | 455/456 |
| 5,677,837 | * | 10/1997 | Reynolds | 455/456 |
| 5,684,476 | * | 11/1997 | Anderson | 340/988 |
| 5,686,910 | * | 11/1997 | Timm et al. | 340/988 |
| 5,689,252 | * | 11/1997 | Ayanogulu et al. | 340/990 |
| 5,699,255 | * | 12/1997 | Ellis et al. | 342/357 |
| 5,712,899 | * | 1/1998 | Pace, II | 342/357 |
| 5,727,057 | * | 3/1998 | Emery et al. | 455/456 |
| 5,848,373 | * | 12/1998 | DeLorme et al. | 342/357 |
| 5,883,598 | * | 3/1999 | Parl et al. | 455/456 |
| 5,944,768 | * | 8/1999 | Ito et al. | 701/200 |
| 5,945,949 | * | 8/1999 | Yun | 455/456 |
| 5,946,611 | * | 8/1999 | Dennison et al. | 455/457 |
| 5,959,577 | * | 9/1999 | Fan et al. | 342/357.13 |
| 6,075,993 | * | 6/2000 | Kawamoto | 455/456 |

FOREIGN PATENT DOCUMENTS

| | | | | |
|---|---|---|---|---|
| 01302377 | * | 12/1989 | (JP) | H04Q/9/00 |
| 05037462 | * | 2/1993 | (JP) | H04Q/7/26 |

* cited by examiner

*Primary Examiner*—Tracy Legree
*Assistant Examiner*—Jean A Gelin
(74) *Attorney, Agent, or Firm*—Frommer Lawrence & Haug LLP; William S. Frommer; Gordon Kessler (57) ABSTRACT

A radiocommunication system including a portable terminal, a base station and a server. The portable terminal transmits a destination to the server and further sends the ID number (CD_ID) of the base station coupled through a radio link to the portable terminal. The server has a table representative of a corresponding relationship between the ID number of the base station and the standing position of the base station and retrieves the position corresponding to the ID number thereof as the present position of the portable terminal from the table. Further, the server transmits map data corresponding to the present position of the portable terminal to the portable terminal.

35 Claims, 10 Drawing Sheets

81 PORTABLE CIRCUIT

FIG. 3

86 SERVER

| BASE STATION ID | POSITION | |
|---|---|---|
| | NORTH LATITUDE | EAST LONGITUDE |
| 0 0 0 1 | 35° 55' 20"<br>~35° 55' 30" | 135° 15' 19"<br>~135° 15' 55" |
| 0 0 0 2 | 35° 55' 25"<br>~35° 56' 10" | 135° 15' 25"<br>~135° 16' 05" |
| 0 0 0 3 | 35° 55' 30"<br>~35° 55' 49" | 135° 15' 20"<br>~135° 15' 45" |
| 0 0 0 4 | 35° 55' 50"<br>~35° 54' 10" | 135° 15' 55"<br>~135° 16' 12" |
| 0 0 0 5 | 35° 55' 10"<br>~35° 54' 30" | 135° 15' 05"<br>~135° 16' 10" |
| ⋮ | ⋮ | ⋮ |

20 PORTABLE TERMINAL

TERMINAL UNIT, POSITION DISPLAY METHOD, INFORMATION PROVIDING SYSTEM, AND INFORMATION PROVIDING METHOD

BACKGROUND OF THE INVENTION

1. Field of the Invention

The present invention relates to a terminal unit, a position display method, an information providing system and an information providing method which are suitably applicable to an navigation system.

2. Description of the Related Art

Figure 17:
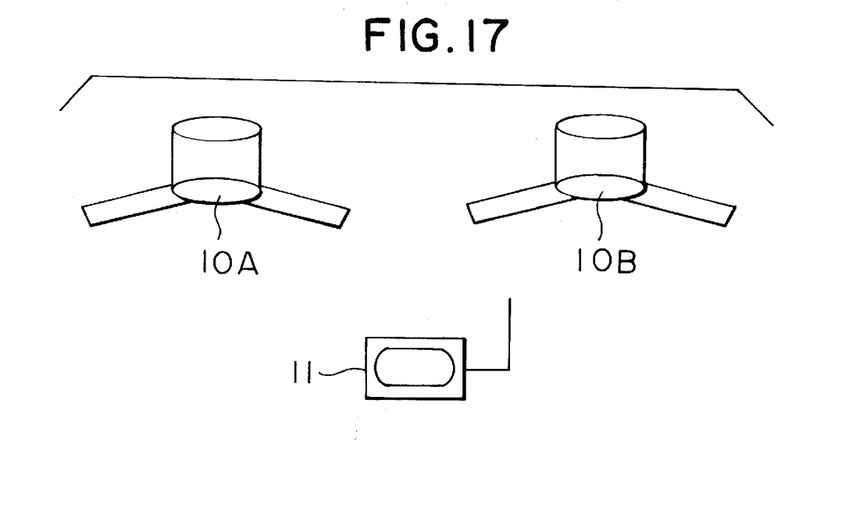
FIG. 17 is an illustration for describing a Global Positioning System.

FIG. 17 shows an example of an arrangement of an navigation system using a prior portable terminal. A plurality of low orbiting satellites 10A and 10B (although two in the illustration, in general at least three low orbiting satellites) constitute a GPS (Global Positioning System) and orbit around the earth at a relatively low position. A portable terminal 11 receives radio waves emitted from the low orbiting satellites 10A, 10B to calculate its own present position.

Figure 18:
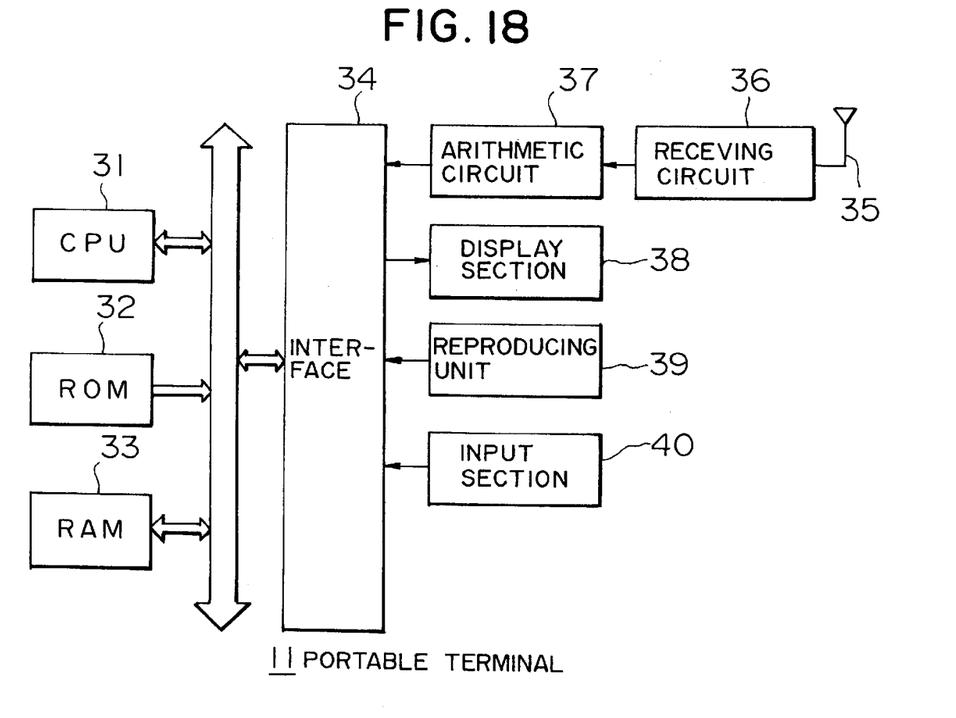
FIG. 18 is a block diagram showing an arrangement example of a portable terminal (11) in FIG. 17.

FIG. 18 is an illustration of an example of an arrangement of the portable terminal 11. In FIG. 18, a CPU 31 executes various processes in accordance with programs stored in a ROM 32, and a RAM 33 stores data, programs and others necessary for the various processes the CPU implements. An input section 40 is used when the user of the portable terminal 11 inputs given instructions, and a display section 38 is composed of a liquid crystal display device or the like to display pictures such as given letters and graphic patterns. A receiving circuit 36 receives, through an antenna 35, radio waves outputted from the low orbiting satellites 10A, 10B to output a demodulated signal to an arithmetic circuit 37. The arithmetic circuit 37 operates the signal fed from the receiving circuit 36 to obtain the present position (latitude and longitude) and outputs it to the CPU 31. A reproducing unit 39 reproduces map data recorded in a recording medium such as a CD-ROM and makes the display section 38 display it. An interface 34 performs the interface processing for the arithmetic circuit 37, the display section 38, the reproducing unit 39 and the input section 40.

In this example, the display section 38 displays the map data the reproducing circuit 39 reproduces from the CD-ROM, and when taking in the position information expressed with the latitude and the longitude from the arithmetic circuit 37, the CPU 31 produces a picture of a present position indicating mark corresponding to that position and outputs the picture via the interface 34 to the display section 38 which in turn, displays the picture. Thus, the map and the present position appear on the display section 38.

Figure 19:
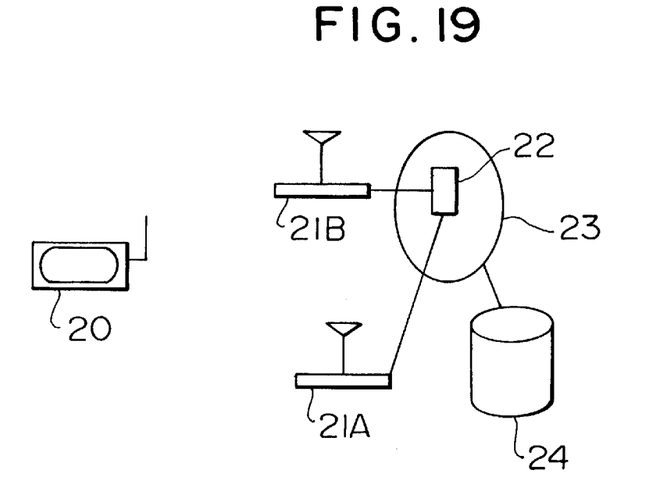
FIG. 19 is an illustration of an arrangement of a radio-communication system network.
Figure 20:
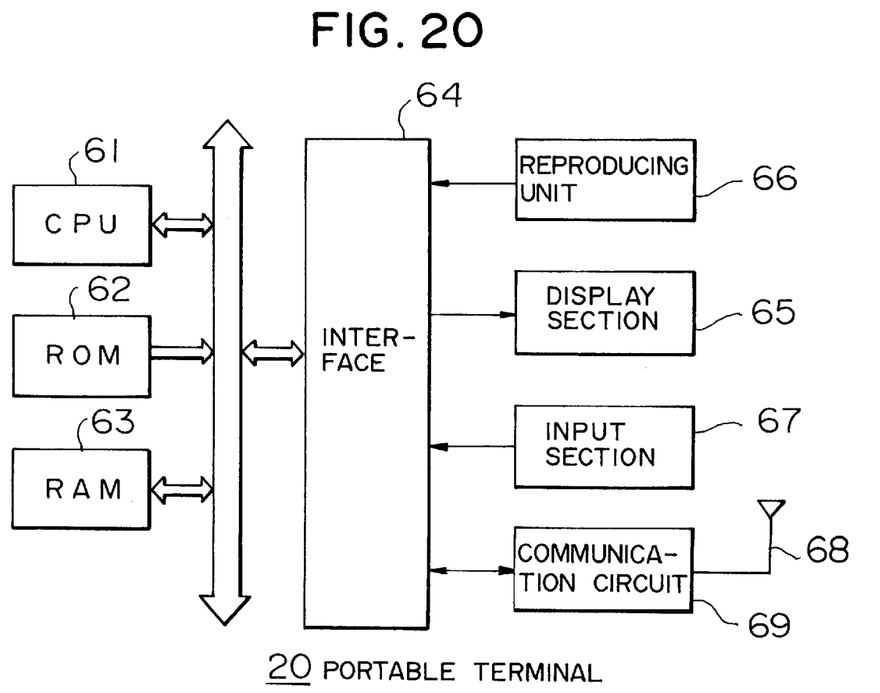
FIG. 20 is a block diagram showing an arrangement example of a portable terminal (20) in FIG. 19.

FIG. 19 shows another example of an arrangement of a navigation system. A portable terminal 20 transmits and receives radio waves to and from the nearest base stations 21A, 21B and gains access through a network 23 with an exchange 22 to, for example, a given database 24. FIG. 20 is an illustration of an example of an arrangement of the portable terminal 20. In FIG. 20, a CPU 61 executes various processes in accordance with programs stored in a ROM 62 and suitably makes a RAM 63 store data or the like. An input section 67 is operated for when the user of the portable terminal 20 inputs given instructions. A reproducing unit 66 reproduces map data recorded in a CD-ROM or the like so that the map data is displayed on a display section 65. A communication circuit 69 establishes communications with the neighboring base station of the base stations including the base stations 21A, 21B. An interface 64 carries out the interface processing for the reproducing unit 66, the display section 65, the input section 67 and the communication circuit 69.

In this example, as well as the FIG. 18 portable terminal 11, the reproducing unit 66 reproduces a map from the CD-ROM and the display section 65 displays it, whereas a method of detecting the present position differs from that in the FIG. 18 terminal 11. That is, in this example, when establishing communication via the communication circuit 69 to the adjacent base station (for example, the base station 21A), the CPU 61 gets an ID (IDentification) number of the base station 21A. Since the base stations 21A, 21B are all equipment fixed at given locations, the positions thereof are known in advance. Accordingly, the position of the base station which is in connecting relation to the portable terminal 20 can be specified by the ID number thereof. For instance, if the RAM 63 stores a corresponding table between the ID numbers of the respective base stations and the positions of the base stations, when receiving the ID number of a base station, the CPU 61 can find the position corresponding to the ID number referring to the table the RAM 63 retains therein. In addition, the CPU 61 can make the display section 65 display the obtained position as the present position.

There is a problem which arises with any one of the conventional portable terminals, however, in that the system increases in size and cost because the reproducing unit 39 or 60 is designed to reproduce the map data. Further, in the case of the FIG. 20 portable terminal 20, since the RAM 63 needs to store the table representative of the corresponding relationship between the ID numbers of the respective base stations and the positions thereof, the increase in the capacity of the RAM 63 is necessary not only to increase the dimension of the portable terminal 20 but also to raise the cost thereof. Still further, in the case of the FIG. 18 portable terminal 11, since the arithmetic circuit 37 is made to calculate the latitude and longitude of the present position, the circuit scale of the arithmetic circuit 37 increases in size and in cost.

SUMMARY OF THE INVENTION

Accordingly, it is an object of the present invention to provide a portable terminal which is smaller in size, low in cost and convenient to carry.

For the elimination of the above-mentioned problems, a terminal unit according to the present invention comprises detection means for detecting a signal to be used for the determination of the present position, transmission means for transmitting the signal detected by the detection means to an external processing unit which determines the present position, reception means for receiving position information on the present position the external processing unit determines, and output means for combining the position information the reception means receives with map information and for outputting the combination result.

In addition, a position display method according to this invention comprises a detection step of detecting a signal for determining the present position, a transmission step of transmitting the signal detected through the detection step to an external processing unit which determines the present position, a reception step of receiving position information on the present position determined in the external processing unit, and an output step of combining the position information the reception step receives with map information to output the combination result.

Furthermore, another terminal unit according to this invention is equipped with position detection means for detecting the present position, transmission means for transmitting the present position the position detection means detects to an external processing unit, reception means for receiving map information including the present position from the external processing unit, and output means for combining the map information the reception means receives with the position information the position detection means detects and for outputting the combination result.

Furthermore, another position display method according to this invention comprises a position detection step of detecting the present position, a transmission step of transmitting the present position detected through the position detection step to an external processing unit, a reception step of receiving map information including the present position from the external processing unit, and an output step of combining the map information received through the reception step with the position information detected through the position detection step and for outputting the combination result.

Furthermore, a different terminal unit according to this invention is provided with input means for performing the input of destination information, transmission means for transmitting the destination information inputted through the input means to an external processing unit which calculates position information on the destination, reception means for receiving the position information on the destination calculated in the external processing unit, and output means for combining the position information from the reception means with map information and for outputting the combination result.

Furthermore, a different position display method according to this invention comprises an input step for performing the input of destination information, a transmission step of transmitting the destination information inputted through the input step to an external processing unit which calculates position information on the destination, a reception step of receiving the position information on the destination calculated in the external processing unit, and an output step of combining the position information received through the reception step with map information to output the combination result.

Furthermore, a different terminal unit according to this invention is composed of detection means for detecting a signal for determining the present position, input means for performing the input of destination information, transmission means for transmitting the present position determining signal detected by the detection means and the destination information inputted through the input means to an external processing unit which determines present position information and destination position information, reception means for receiving the present position information and the destination position information determined in the external processing unit, and output means for combining the present position information and destination position information the reception means receives with map information and for outputting the combination result.

Furthermore, a different position display method according to this invention comprises a detection step of detecting a signal for determining the present position, an input step of performing the input of destination information, a transmission step of transmitting the present position determining signal detected through the detection step and the destination information inputted through the input step to an external processing unit which determines present position information and destination position information, a reception step of receiving the present position information and destination position information determined in the external processing unit, and an output step of combining the present position information and destination position information obtained through the reception step with map information to output the combination result.

Still further, an information providing system comprises reception means for receiving a signal indicative of the present position of a terminal unit connected through a communication line thereto, determination means for determining the present position of the terminal unit on the basis of the signal the reception means receives, and transmission means for transmitting the present position determined by the determination means to the terminal unit.

Moreover, an information providing method according to this invention comprises a reception step of receiving a signal indicative of the present position of a terminal unit connected via a communication line thereto, a determination step of determining the present position of the terminal unit on the basis of the signal obtained through the reception step, and a transmission step of transmitting the present position determined through the determination step to the terminal unit.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE PREFERRED EMBODIMENTS

Figure 1:
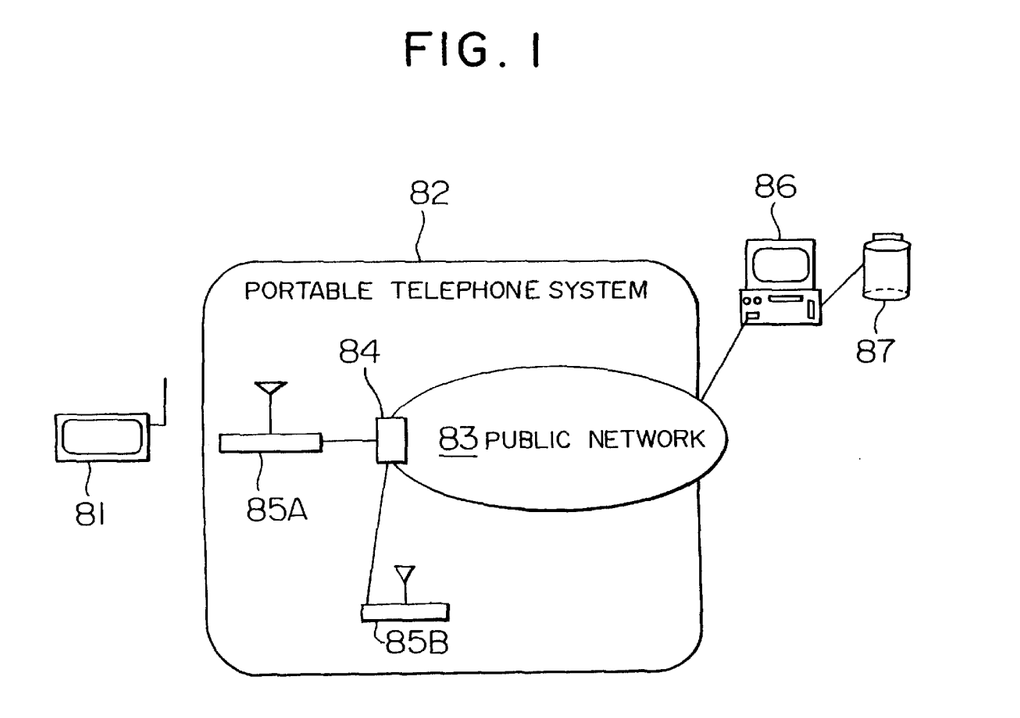
FIG. 1 is an illustration of an arrangement of a simplified type portable telephone system adopting a terminal unit according to the present invention.

FIG. 1 is an illustration of an arrangement of a navigation system adopting a terminal unit according to the present invention. In FIG. 1, a portable terminal 81 is a portable terminal subscribing for a portable telephone system, and a portable telephone system network 82 of an enterpriser for which the portable terminal 81 subscribes includes a public network 83 with an exchange 84 and a plurality of base stations 85A, 85B (of the plurality of base stations, two illustrated in FIG. 1). The portable terminal 81 is made to be capable of establishing communications through radio waves with the nearest base station of the plurality of base stations 85 (if not necessary to distinguish among them, all the base stations including the base stations 85A, 85B are wholly referred to as base stations 85). In this embodiment, for the description only, a PHS (Personal Handy Phone System) is used as one example of the portable telephone system network. The PHS is one of the mobile station communication systems in Japan where radio base stations are installed at an interval of several hundred meters in the outdoor places and telephone terminal units periodically transmit and receive position information to and from the neighboring base station of a plurality of base stations and make communications through this base station with different telephone terminal units. Further, when adopting the TDD (Time Division Duplex) method, the PHS compresses the aural signal in a state with dividing it with time to accomplish the transmission and reception at one carrier frequency. Moreover, when employing the TDMA (Time Division Multiple Access) method, the PHS performs the multiplex communications in such a manner as to divide four channels with time at one carrier frequency. The frequency band used for the communications by the PHS is 1.9 GHz, and the digital data communication is possible at a transmission speed of 32 kbit/sec per one channel. If one terminal uses a plurality of channels, the data transmission is possible at a maximum of 128 kbit/sec (32 k×4 channels).

In addition, The public network 83 is in connecting relation to a server 86 which in turn, is in connecting relation to a database 87.

Figure 2:
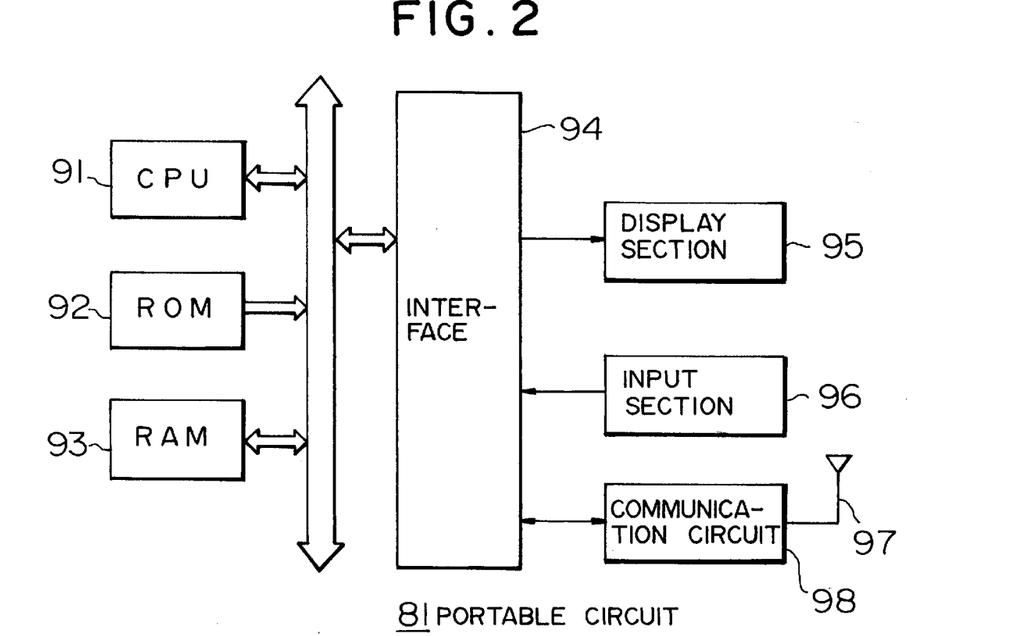
FIG. 2 is a block diagram showing an example of an arrangement of a portable terminal (81) in FIG. 1.

The portable terminal 81 has an arrangement, for example, as shown in FIG. 2. In FIG. 2, a CPU 91 executes various processes in accordance with programs stored in a ROM 92, and a RAM 93 is designed to store programs and data necessary for the various processes in the CPU. An input section 96 is composed of buttons, switches, keys and others, with the user of the portable terminal 81 operating the input section 96 to input given instructions via an interface 94 to the CPU 91. In addition, if given input takes place through voices, the input section 96 further includes a microphone for receiving the voices. The input section 96 is additionally equipped with an IC card reading unit for reading from an IC card.

A display section 95 is constructed with a liquid crystal display device and displays pictures such as letters and graphic patterns fed via the interface 94, and a communication circuit 98 establishes radio wave communications through an antenna 97 with a given base station 85.

Figure 3:
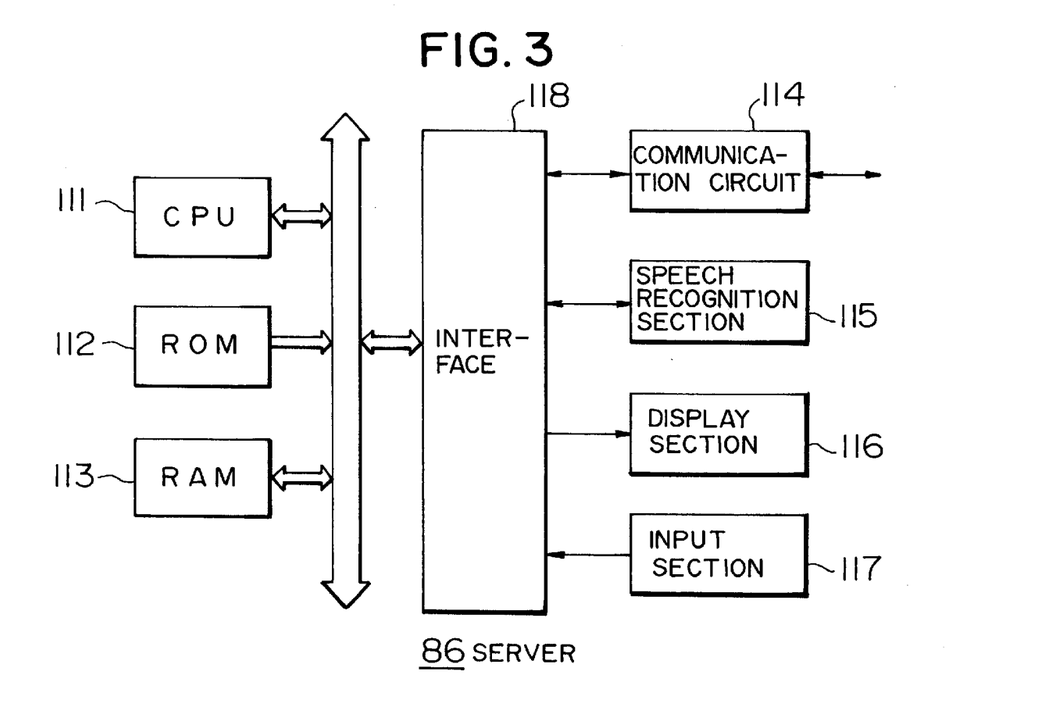
FIG. 3 is a block diagram showing an example of an arrangement of a server (86) in FIG. 1.

On the other hand, a server 86 has an arrangement, for example, as shown in FIG. 3. A CPU 111 executes various processes in accordance with programs stored in a ROM 112, and a RAM 113 suitably stores programs and data necessary for the various processes in the CPU 111. An input section 117 is composed of a keyboard, a mouse, a microphone and others and is operated when inputting various instructions. A speech recognition section 115 recognizes an aural signal inputted through a communication circuit 114 and outputs the recognition result through an interface 118 to the CPU 111. Further, a display section 116 is constructed with a liquid crystal display device, a CRT or the like and displays pictures such as characters and graphic patterns inputted via the interface 118. The aforesaid communication circuit 114 is designed to make communications through the portable telephone system network 82 and the public network 83 with the portable terminal 81.

Figure 4:
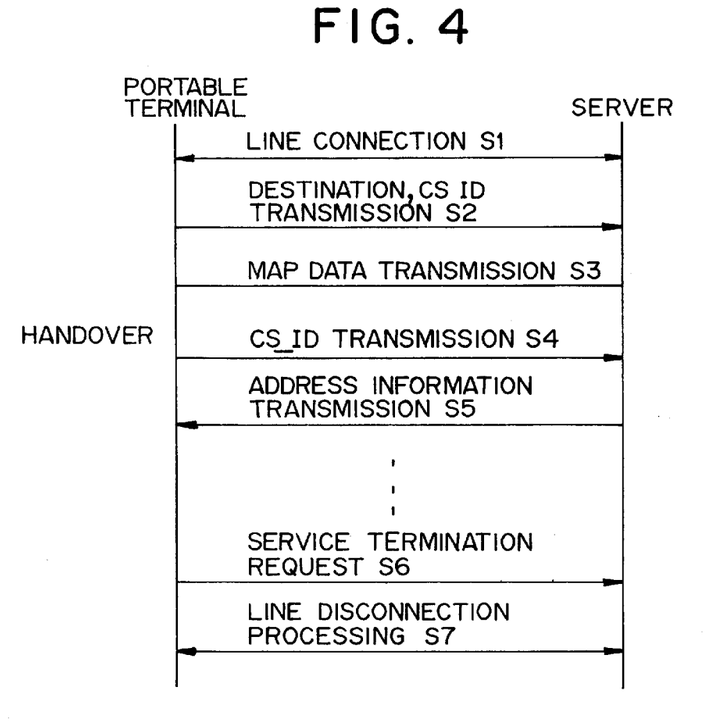
FIG. 4 is a flow chart useful for describing an operation of the FIG. 1 embodiment.

Secondly, an operation thereof will be described hereinbelow referring to a flow chart of FIG. 4. First of all, at step S1 the user operates the input section 96 of the portable terminal 81 to make connection of a line through the portable telephone system network 82 to the server 86. In addition, at this time, the CPU 91 gets, as the present position, the ID number (CS_ID) (an identification number for identifying each of base stations) of the base station 85 establishing a communication link therewith and makes the RAM 93 store it. In addition, the CPU 91 makes a navigation service request to the server 86. Subsequently, at step S2 the CPU 91 outputs the destination information and the ID number of the base station 85 connected to the communication line through the communication circuit 98 to the server 86.

Figure 5:
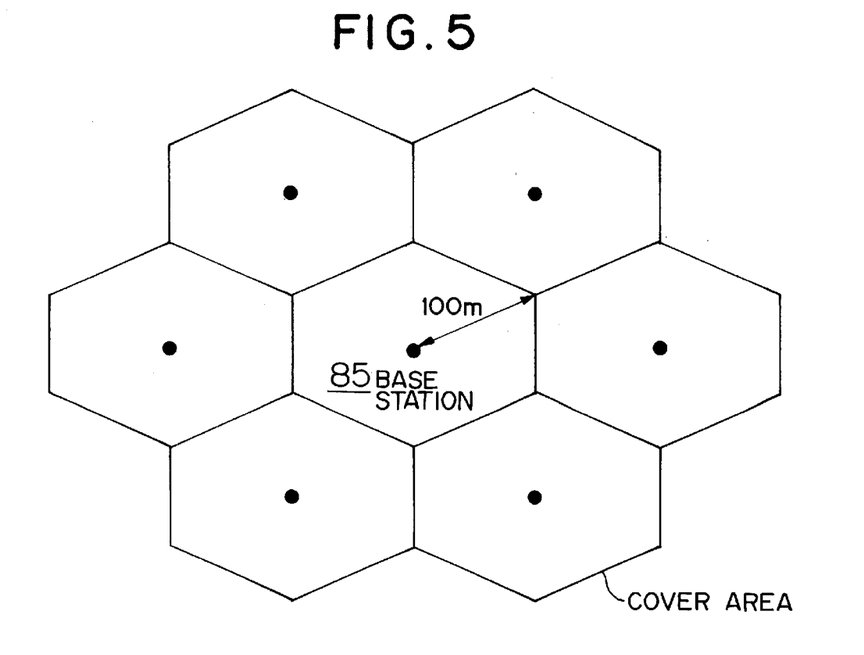
FIG. 5 is an illustration available for explaining the cover areas of base stations.

In the PHS, as shown in FIG. 5 the base station 85 is installed within each of cover areas having a radius of approximately 100 meters. For the communication, each of the base stations 85 gives and receives a radio wave to and from the portable terminal 81 standing within the corresponding cover area. Accordingly, when the portable terminal 81 sets up a communication link with a given base station 85 (for example, the base station 85A in FIG. 1), an estimation can be made such that the portable terminal 81 exists within the cover area of that base station 85 (in the above example, the base station 85A).

Figure 6:
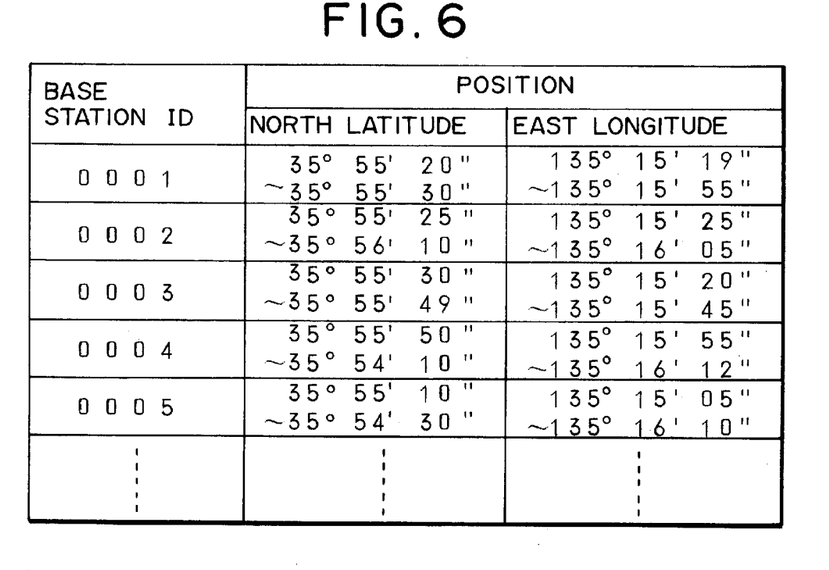
FIG. 6 shows an example of a table representing a corresponding relationship between an ID number of a base station and a position thereof.

Thus, if as shown in FIG. 6 the corresponding relationship between the ID number of each of the base stations 85 and the cover area (position) thereof is stored in the form of a table in the RAM 113 of the server 86 in advance, when receiving the ID number of the base station from the portable terminal 81, the server 86 can detect that cover area (the present position of the portable terminal 81) on the basis of the ID number. For example, in the case of the FIG. 6 example, if the ID number of the base station 85 is 0002, an decision can be made to that the portable terminal 81 stands within a range of the north latitude 35 degrees 55 minutes 25 seconds to 35 degrees 56 minutes 10 seconds and the east longitude 135 degrees 15 minutes 25 seconds to 135 degrees 16 minutes 5 seconds. Accordingly, the CPU 91 of the portable terminal 81 transmits the ID number of the base station 85 as the present position at the step S2.

Furthermore, for example, the destination of the movement of the user carrying the portable terminal 81 can be inputted as follows. The first input method relates to inputting the telephone number of the destination through the operation of the keys of the input section 96. In response to the input of the destination telephone number from the input section 96, the CPU 91 outputs the telephone number via the communication circuit 98 to the server 86. When the server 86 receives this telephone number through the communication circuit 114, the CPU 111 sets up access through the communication circuit 114 to the database 87 to retrieve the address corresponding to the telephone number and further to retrieve the position (latitude and longitude) of the address. Further, the CPU 111 makes the RAM 113 store the obtained position information as the position of the destination of the portable terminal 81.

The second input method relates to a method in which the user inputs the destination with a speech through a microphone of the input section 96. The CPU 91 outputs the aural signal through the communication circuit 98 to the server 86. When the server 86 receives the aural signal through the communication circuit 114, the speech recognition section 115 performs the speech recognition processing. The CPU 111 retrieves the position information (for example, latitude and longitude) corresponding to the place name attained through the speech recognition from the database 87. The position information is stored as the position of the destination of the portable terminal 81 in the RAM 113.

As the third input method, a method is available to use an IC card. In this instance, an IC card reading unit provided in the input section 96 is used. In this IC card, the position data (latitude and longitude) of the destination are registered in advance through the use of a personal computer or the like. When this IC card is mounted in the card reading unit provided in the input section 96, the CPU 91 reads out the data therefrom and sends it through the communication circuit 98 to the server 86. Incidentally, it is also appropriate that a plurality of data are stored in advance in the IC card through a personal computer. That is, when the IC card is mounted in the IC card reading unit of the input section 96, the CPU 91 reads out the plurality of previously stored position data from the IC card and displays these position data on the display section 95 in the form of a list. The user using the portable terminal 81 uses keys on the input section 96 to select the position data to be set as the destination from the plurality of position data displayed on the display section 95. The CPU 91 transmits the position data, selected by the user, through the communication circuit 98 to the server 86.

The fourth input method relates to a method in which the user directly inputs the latitude and longitude of the destination as numeric data. In this case, the user inputs the latitude and longitude values of the destination through the use of the keys fitted on the input section 96 of the portable terminal 81. The CPU 91 makes the RAM 93 temporarily store the numeric data on the latitude and longitude inputted by the user and then transmits them via the communication circuit 98 to the server 86.

The fifth input method is a method to input the destination on the basis of map data displayed on the display section 95. The CPU 91 of the terminal unit 81 issues a map data request command to the server 86. In response to the reception of the map data request command, the CPU 111 of the server 86 extracts the map data from the database 87 and sends the map data via the communication circuit 114 to the terminal unit 81. The terminal unit 81, receiving the map data via the communication circuit 98, accumulates the map data in the RAM 93 and displays it on the display section 95. The user, using the terminal unit 81, indicates the area of the vicinity of the destination through the input section 96 on the basis of the map data displayed on the display section 95. The CPU 91 retrieves the position information on the area of the vicinity of the destination inputted through the input section 96 from the map data stored in the RAM 93 and transmits the position information via through the communication circuit 98 to the server 86. In response to the reception of the position information, the server 86 selects more detailed map data (that is, the map data different in scale) from the database 87 and sends it via the communication circuit 114 to the terminal unit 81. When receiving new map data, the terminal unit 81 makes the RAM 93 store the new map data and display section 95 display it. When the user sets the destination on a map through the input section 96 on the basis of the new map data (the detailed map data) displayed on the display section 95, the CPU 91 retrieves the position information (latitude and longitude) on the destination from the map data stored in the RAM 93 and transmits the retrieval result as the destination position information via the communication circuit 98 to the server 86.

Figure 7:
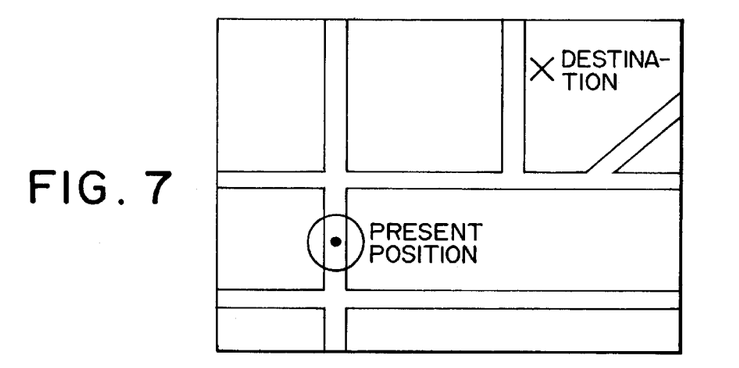
FIG. 7 is an illustration of a display example on a display section (95) in FIG. 2.

In response to the above-mentioned supply of the present position (the cover area of the base station 85) and the destination position information, at step S3 the CPU 111 of the server 86 reads out the map data including the present position and the destination from the database 87 and transmits it to the portable terminal 81. In response to the input of the map data via the communication circuit 98, the CPU 91 of the portable terminal 81 once stores that data in the RAM 93 and reads out that data for displaying on the display section 95. Whereupon, for example, as shown in FIG. 7 a map on which the present position mark and the destination mark are superimposed is displayed on the display section 95.

Thus, in this embodiment the present position, the destination position information and the map data are supplied from the server 86 to the portable terminal 81. In addition, the CPU 91 of the portable terminal 81 reads out the present position mark (a circle mark in FIG. 7) and the destination mark (x mark in FIG. 7) stored in the RAM 93 and superimposes or places the marks on the map data on the basis of the position information sent from the server 86 to display them on the display section 95 as shown in FIG. 7. Accordingly, it is possible to more simplify the arrangement of the portable terminal 81 in the manner that the present position and the destination position are also placed under the control of the server 86. Incidentally, it is also appropriate that the present position mark and the destination mark to be displayed on the display section 95 are designed to be fed from the server 86.

Figure 8:
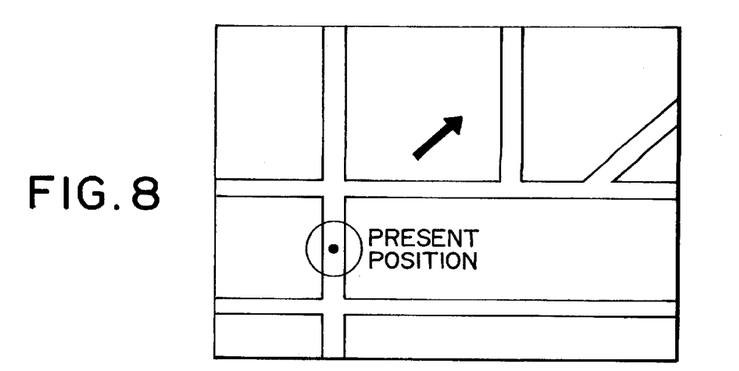
FIG. 8 is an illustration of another display example on a display section (95) in FIG. 2.

Furthermore, in cases where the destination and the present position are greatly remote from each other so that a map including both the destination and present position is difficult to display on the display section 95 of the portable terminal 81, the CPU 111 of the server 86 calculates the direction of the destination viewed from the present position on the basis of the position information on the present position and the destination. Thereafter, the server 86 transmits the position information on the portable terminal 81, the direction information on the destination, together with the map data, to the portable terminal 81. On the basis of the received position information and destination direction information, the CPU 91 of the portable terminal 81 displays, on the display section 95, the superimposition of the present position and an arrow indicative of the direction of the destination viewed from the present position on a map as shown in FIG. 8.

When the user carrying the portable terminal 81 moves to shift from the cover area of the base station 85 till now to the cover area of a different base station 85, in the case of the PHS, an handover processing is conducted to again establish a radio link with the new base station 85. When this handover processing is conducted, at step S4 the CPU 91 of the portable terminal 81 gets the ID number of the new base station 85 and then transmits it to the server 86. In response to the reception of the ID number of the new base station 85, at step S5 the CPU 111 of the server 86 newly outputs the present position (latitude and longitude) of the portable terminal 81 via the communication circuit 114 to the portable terminal 81. On receiving the new present position, the CPU 91 of the portable terminal 81 makes the RAM 93 stores the new present position and then reads it out to update the display on the display section 95. Whereupon, the display of the present position is renewed whenever the portable terminal 81 shifts to a new cover area. If the range of the map stored in the RAM 93 and displayed on the display section 95 comes to a difficulty of covering the present position or the destination, the CPU 91 of the portable terminal 81 makes a request for the transfer of new map data toward the server 86. In this way, the user can reach the destination referring to the map displayed on the display section 95.

For terminating the reception of the navigation service, the user operates the input section 96 to give instructions for termination to the CPU 91. At this time, at step S6 the CPU 91 outputs a service termination request signal to the server 86, and at step S7 the CPU 91 controls the communication circuit 98 to implement the line cut-off processing. It is also possible to carry out this cut-off processing in the server 86 side.

Figure 9:
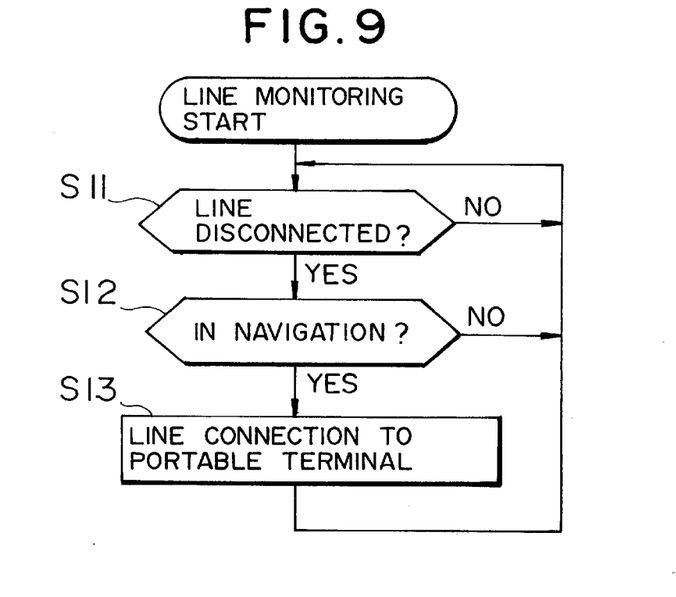
FIG. 9 is a flow chart for describing a line monitoring processing operation of a server (86) in FIG. 3.

In the case of the PHS, when extending over an exchange and moving to the cover area of a base station connected to a different exchange, the handover comes to difficulty. For this reason, the moment that the handover extending over the exchange takes place, the line is cut. In consequence, it is impossible that the portable terminal 81 continuously receives the navigation service from the server 86. Thus, the CPU 111 of the server 86 performs a line monitoring process as shown in FIG. 9 while supplying the navigation service. That is, first of all, at step S11 the CPU 111 decides, through the handover extending over the exchange, whether the line is cut off or not. If not cut, a given process is conducted till disconnection. Further, if the answer of step S11 indicates that the line is cut off, the operational flow goes to a step S12 to check whether or not the portable terminal 81 is now receiving the navigation service. If not receiving the navigation service, the operational flow returns to the step S11 to repeatedly execute the following processes. On the other hand, if the decision of the step S12 is the reception of the navigation service, the operational flow advances to a step S13 where the CPU 111 again conducts the line connecting process to the portable terminal 81.

In this way, in cases where the line comes into disconnection because of the handover extending over the exchange, the server 86 automatically performs the line connecting process to the portable terminal 81 to continuously supply the navigation service. It is also possible that this line monitoring process is conducted in the CPU 91 of the portable terminal 81. Thus, even if the line is temporarily disconnected due to the handover extending over the exchange, when the line connecting process is quickly done in such a way, the map data stored in the RAM 93 continuously appears on the display section 95, and therefore the user can substantially receive the navigation service from the server 86 without noticing the fact of the disconnection of the line.

Figure 10:
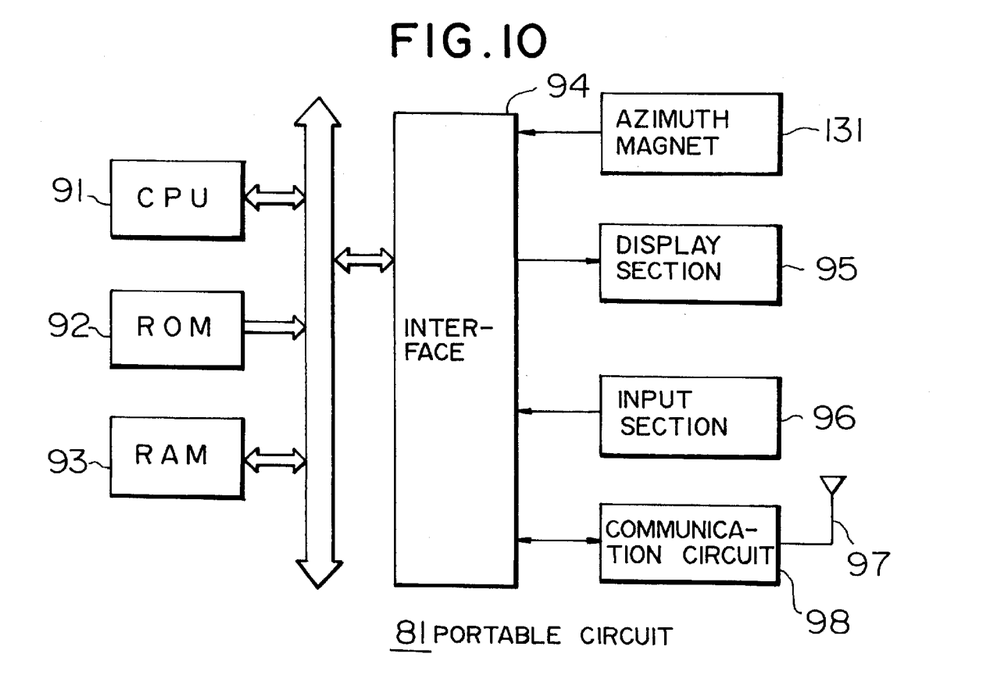
FIG. 10 is a block diagram showing another arrangement example of a portable terminal (81) according to this invention.
Figure 11:
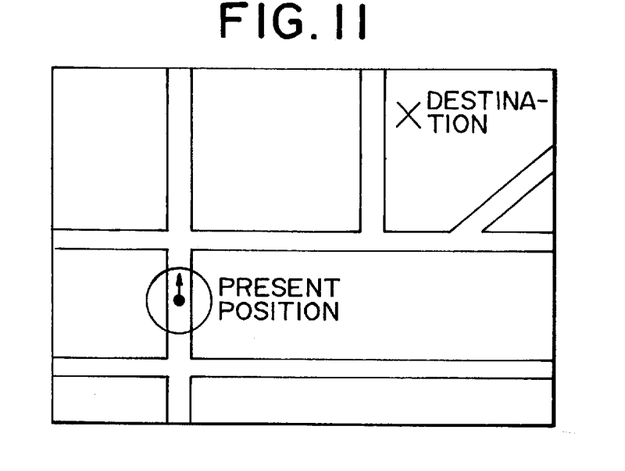
FIG. 11 is an illustration of an example of a display on a display section (95) in FIG. 10.

The FIG. 2 embodiment can not detect the direction of movement of the portable terminal 81. Thus, for example, as shown in FIG. 10 an azimuth magnet 131 is provided in the portable terminal 81 to sense the direction in which the portable terminal 81 moves. On the basis of direction information obtained from the azimuth magnet 131, as shown in FIG. 11 the CPU 91 of the portable terminal 81 displays, on the display section 95, the data produced by together superimposing a circle mark indicative of the present position and an arrow mark representative of the direction of movement of the portable terminal 81 on a map. In this way, the user can find the direction of the portable terminal 81 on the map.

It is also appropriate that the portable terminal 81 transfers the advancing direction detected by the azimuth magnet 131 to the server 86. In this case, the CPU 111 of the server 86 superimposes an arrow mark indicative of the advancing direction of the portable terminal 81 on a map and then sends the map data to the portable terminal 81. Further, it is also possible that the previous position information on the cover areas is stored in the RAM 93 so that the CPU 91 of the portable terminal 81 calculates the difference between the present cover area position information and the previous cover area position information to make the display section 95 display the advancing direction of the portable terminal 81 on the basis of the difference information. Still further, it is also possible that the previous cover area position information is stored in the RAM 113 of the server 86 so that the CPU 111 of the server 86 obtains the difference between the present cover area position information on the portable terminal 81 and the previous cover area position information thereon to calculate the moving direction of the portable terminal 81 on the basis of the difference information and to transmit the advancing direction to the portable terminal 81.

Although in this embodiment the CPU 91 of the portable terminal 81 places, on the map data, the marks indicative of the present position, the destination, the direction of the destination and the moving direction to be displayed on the display section 95, it is also possible that the CPU 111 of the server 86 accomplishes the superimposition of these marks on the map information and then transmits the map information to the portable terminal 81. With this arrangement, the processing load in the portable terminal 81 is reducible and the reduction of the portable terminal 81 in size is possible. Further, although the PHS is used as an example of the portable telephone system, it is also possible to employ a different radio telephone system (for example, a digital cellular system).

Figure 12:
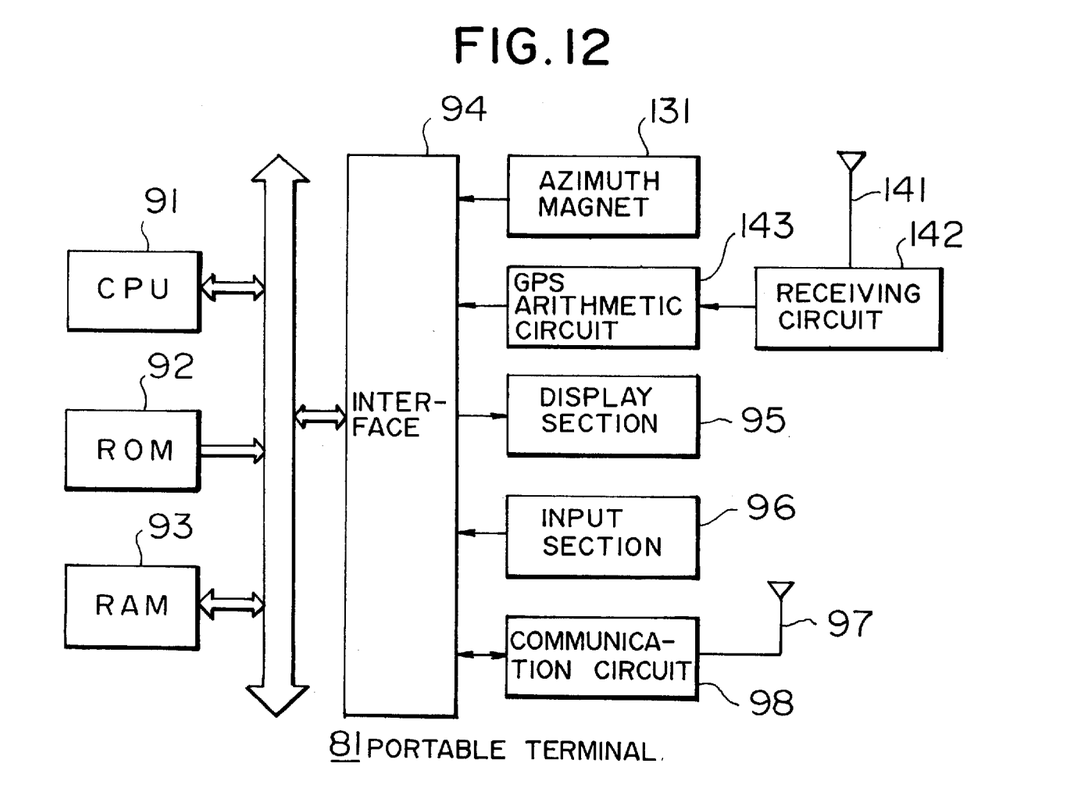
FIG. 12 is a block diagram showing a different arrangement example of a portable terminal (81) according to this invention.

Although in the above-described embodiments the present position is detected on the basis of the cover area of the base station 85, it is possible to detect the present position on the basis of the radio wave from the GPS. That is, in this case, as shown in FIG. 12 the portable terminal 81 is provided with a receiving circuit 142 having a GPS antenna 141. The receiving circuit 142 receives, through the GPS antenna 141, the radio wave emitted from low orbiting satellites and demodulates it. A GPS arithmetic circuit 143 calculates the present position (latitude and longitude) on the basis of the demodulation output. The CPU 91 transfers this present position via the communication circuit 98 to the server 86. When receiving this present position through the communication circuit 114, the CPU 111 of the server 86 retrieves the map data corresponding to the present position from the database 87 and transmits it via the communication circuit 114 to the portable terminal 81.

Figure 13:
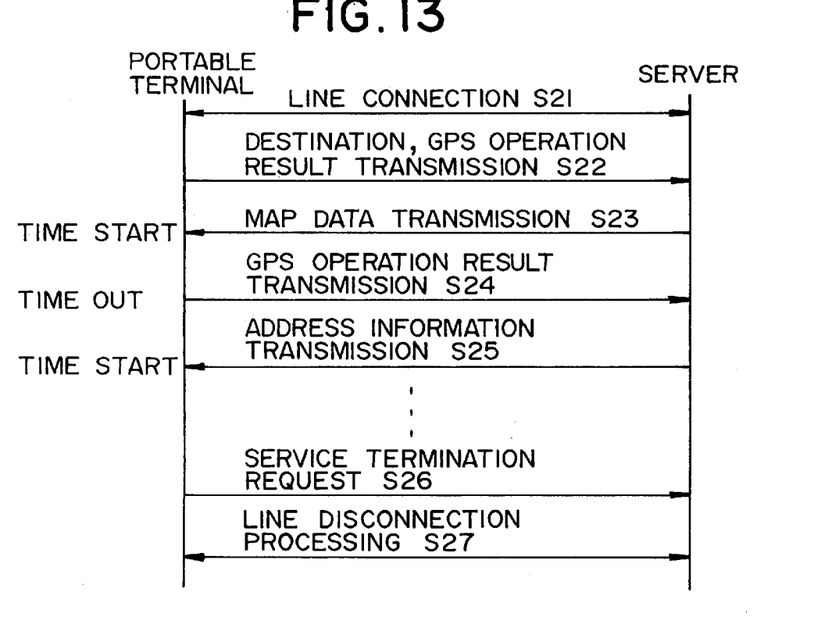
FIG. 13 is a flow chart useful for explaining an operation of a portable terminal (81) in FIG. 12.

In the case of constructing the portable terminal 81 as shown in FIG. 12, the operation is conducted as shown in FIG. 13. That is, first of all, at step S21 the CPU 91 of the portable terminal 81 performs the line connecting processing to the server 86. Further, on the connection of the line, at step S22 the CPU 91 sends the present position data obtained through the calculation in the GPS arithmetic circuit 143 via the communication circuit 98 to the server 86. In addition, at this time, the CPU 91 also transmits the destination inputted through the input section 96 in accordance with the above-mentioned method to the server 86. When receiving the data comprising the destination and the present position from the portable terminal 81 through the communication circuit 114, the CPU 111 of the server 86 retrieves the map data including the destination and the present position from the database 87. Further, at step S23 the CPU 111 transmits the map data via the communication circuit 114 to the portable terminal 81.

The CPU 91 of the portable terminal 81 receives this map data through the communication circuit 98 and makes the RAM 93 once store this map data and then reads out the map data to display it on the display section 95. Accordingly, the user can move for the destination referring to the map on the display section 95. Further, on the reception of the map data from the server 86, the CPU 91 starts a built-in timer. On counting a given time, at step S24 the CPU 91 reads out the present position calculated in the GPS arithmetic circuit 143 at that time and again sends the calculation result (present position) to the server 86. On receiving the new present position data, the CPU 111 of the server 86 obtains the location of the present position on the map. Subsequently, at step S25 the CPU 111 again transmits the obtained position information on the map to the portable terminal 81.

With the repetition of the above-mentioned operation, whenever a given time period passes, a map on which a new present position is superimposed is displayed on the display section 95 of the portable terminal 81. If the range of the map stored in the RAM 93 comes to difficulty of covering the present position or the destination, as well as the above-mentioned case, new map data is transferred from the server 86. The operations in steps S26 and S27 for the termination of the navigation service are the same as those in the steps S6 and S7 of FIG. 4.

The receiving circuit 142 and the GPS arithmetic circuit 143 in FIG. 12 substantially have the same arrangements as those of the receiving circuit 36 and the arithmetic circuit 37 in FIG. 18. However, unlike the FIG. 18 example, in the FIG. 12 embodiment the map data is not reproduced through the reproducing unit 39 but is obtained from the server 86, with the result that the arrangement of the portable terminal 81 can be simplified by a quantity corresponding to the arrangement of the reproducing unit 39, thus suppressing the increase in dimension.

The omission of the GPS arithmetic circuit 143 is also possible. In this instance, the CPU 91 of the portable terminal 81 implements the line connecting processing to the server 86. The CPU 91 of the portable terminal 81 sends the demodulated signal demodulated by the receiving circuit 142, together with the destination data, via the communication circuit 97 to the server 86. On receiving the demodulated signal, the server 86 calculates the present position (latitude and longitude) of the portable terminal 81 on the basis of the demodulated signal from the portable terminal 81. On the basis of this present position, the CPU 111 of the server 86 retrieves, from the database 87, the map data including the destination from the portable terminal 81 and the calculated present position of the portable terminal 81. Further, the CPU 111 sends the map data via the communication circuit 114 to the portable terminal 81. The following operations (the step S23 and the following steps in FIG. 13) are the same as those in the above-described embodiment. With this arrangement, the necessity to include the GPS arithmetic circuit 143 in the portable terminal 81 side is eliminable, thus further reducing the size of the portable terminal 81.

Figure 14:
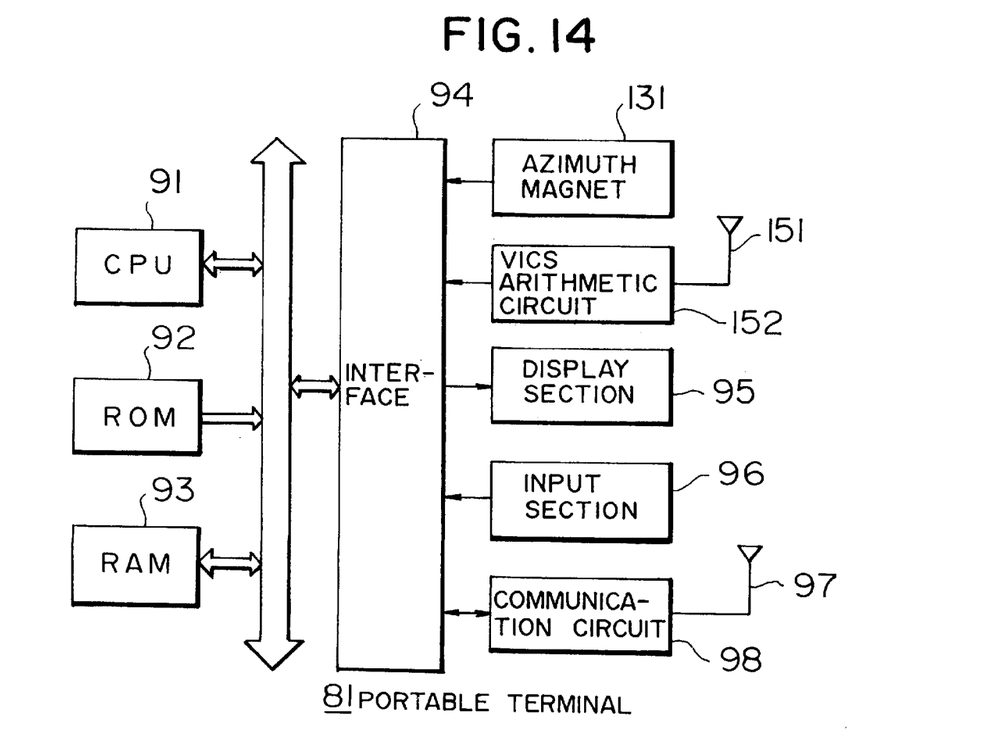
FIG. 14 is a block diagram showing a different arrangement example of a portable terminal (81) according to this invention.

FIG. 14 shows a different arrangement of the portable terminal 81. In addition to the embodiment as shown in FIG. 10, this embodiment includes a VICS (Vehicle Information and Communication System) arithmetic circuit 152 equipped with a VICS antenna 151. The VICS is a system for supplying the traffic information through beacons installed on given positions of a road to motor vehicles or the like, and further transmits the position information on each of the beacons, and hence the position information on the beacons is obtainable in a manner that the VICS arithmetic circuit 152 demodulates the radio wave captured through the VICS antenna 151. Thus, the CPU 91 can detect as the present position of the portable terminal 81 the position information obtained by the VICS arithmetic circuit 152.

Figure 15:
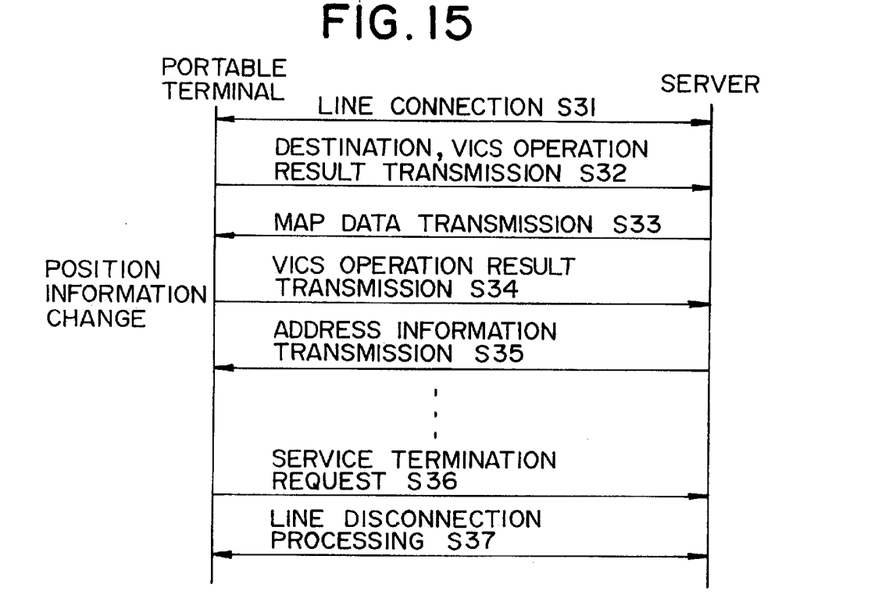
FIG. 15 is a flow chart for describing an operation of a portable terminal in FIG. 14.

In the case of constructing the portable terminal 81 as shown in FIG. 14, the operation between the portable terminal 81 and the server 86 is made as shown in the flow chart of FIG. 15. That is, at step S31 the CPU 91 of the portable terminal 81 performs the line connecting processing to the server 86, and when the line comes into connection, at step S32 the CPU 91 transmits the present position (VICS operation result) obtained by the VICS arithmetic circuit 152 and the destination data to the server 86. At step S33 the server 86 retrieves the map data corresponding to the destination and the present position from the database 87 and sends it to the portable terminal 81. When the VICS arithmetic circuit 152 gets new position information, at step S34 the CPU 91 sends the VICS operation result to the server 86. Further, at step S35 the server 86 accordingly transmits the position information on a map corresponding to the new present position to the portable terminal 81. The operations in steps S36 and S37 for terminating the service are the same as those in the steps S6 and S7 in FIG. 4.

In this way, in this embodiment the present position is obtained by the VICS arithmetic circuit 152, while the reproducing unit 39 in FIG. 18 becomes unnecessary because the map data itself is transmitted from the server 86, thus achieving the decrease in size accordingly.

Figure 16:
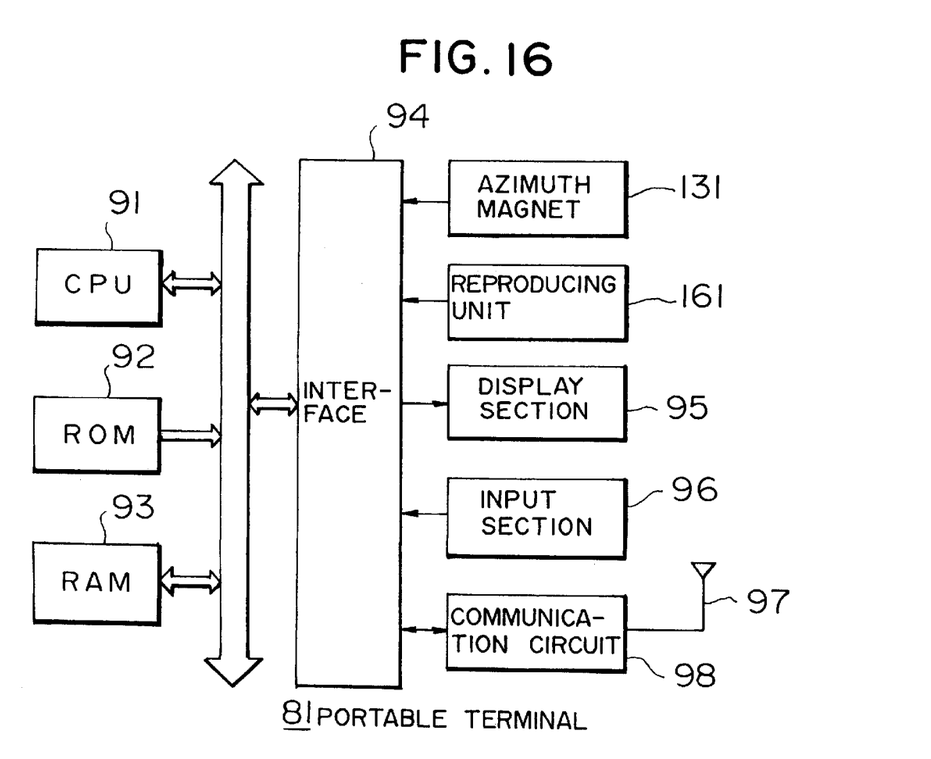
FIG. 16 is a block diagram showing a different example of an arrangement of a portable terminal (81) according to this invention.

FIG. 16 shows a different arrangement of the portable terminal 81. This embodiment includes a reproducing unit 161 so that the map data recorded in a CD-ROM or the like is read out and displayed on the display section 95. Accordingly, in this embodiment, there is no need to transfer the map data itself from the server 86. However, in this case, the reproducing unit 161 increases the size of the portable terminal 81, whereas the GPS arithmetic circuit 143 in FIG. 12 and the VICS arithmetic circuit 152 in FIG. 14 are omitted. Further, as well as the FIG. 2 embodiment the CPU 91 detects the present position by receiving the ID number of the base station 85 through the communication circuit 98 and transmits the ID number as the present position to the server 86. Accordingly, in this embodiment it is possible to suppress the increase in size of the portable terminal by a quantity corresponding to the receiving circuit 36 and the arithmetic circuit 37 of the portable terminal 11 in FIG. 18.

Although in the above description the present invention is applied to the portable terminal, this invention is also applicable to a terminal unit which is mounted on a motor vehicle and moved together therewith. According to this invention, it is possible not only to decrease the size of the terminal unit, but also to make the terminal unit easy to carry, and even to lower the cost. Moreover, since the map information is received with a scale allowing the simultaneous display of the present position and the destination, it is possible to quickly and accurately find the direction of the destination and hence to quickly reach the destination.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A terminal unit comprising:

detection means for detecting at said terminal unit a signal to be used for determination of a present position of said terminal unit, said signal being demodulated from a multiplexed received signal;

transmission means for transmitting said signal as detected by said detection means without performing position determination processing on said detected signal at said terminal unit, to an external processing unit positioned apart from said terminal unit to determine the present position of said terminal unit;

reception means for receiving position information at said terminal unit on the present position of said terminal unit, determined in said external processing unit; and output means for combining said position information said reception means receives, by indicating the position information superimposed on map information and for outputting the combination result.

2. A terminal unit as defined in claim 1, wherein said reception means receives said map information from said external precessing unit.

3. A terminal unit as defined in claim 1, further comprising azimuth detection means for detecting an azimuth.

4. A terminal unit as defined in claim 1, wherein said transmission means and said reception means are connected through a base station on a radiocommunication line to said external processing unit.

5. A terminal unit as defined in claim 4, wherein said detection means detects an identification number of said base station as said signal for the determination of the present position.

6. A terminal unit as defined in claim 1, wherein said transmission means and said reception means are connected through a base station on a radio telephone line to said external processing unit.

7. A terminal unit as defined in claim 1, wherein said detection means detects a radio wave from a satellite as said signal for the determination of the present position.

8. A terminal unit as defined in claim 1, wherein said detection means detects a radio wave from a beacon, which transmits traffic information, as said signal for the determination of the present position.

9. A position display method comprising the steps of:

detecting a signal at a terminal unit to be used for determining a present position of said terminal unit, said signal being demodulated from a multiplexed received signal;

transmitting said detected signal without performing position determination processing on said detected signal at said terminal unit to an external processing unit positioned apart from said terminal unit which determines the present position of said terminal unit;

receiving position information at said terminal unit on the present position of said terminal unit, determined in said external processing unit;

combining the received position information by indicating the position information superimposed on map information; and outputting the combined result.

10. The position display method of claim 9, further comprising the step of receiving said map information from said external processing unit.

11. The position display method of claim 9, further comprising the step of detecting an azimuth of said terminal unit.

12. The position display method of claim 9, wherein said detected signal is transmitted to said external processing unit and said position information is transmitted to said terminal unit through a base station comprising a portion of a radio communication system.

13. The position display method of claim 12, further comprising the step of detecting an identification number of said base station as said signal to be detected at the terminal unit for determining the present position of the terminal unit.

14. The position display method of claim 9, wherein said detected signal is transmitted to said external processing unit and said position information is transmitted to said terminal unit through a base station comprising a portion of a telephone system.

15. The position display method of claim 9, further comprising the step of detecting a radio wave from a satellite as said signal to be detected at the terminal unit for determining the present position of the terminal unit.

16. The position display method of claim 9, further comprising the step of detecting a radio wave from a beacon that transmits traffic information as said signal to be detected at the terminal unit for determining the present position of the terminal unit.

17. A terminal unit comprising:

detection means for detecting a signal at a terminal unit to be used for determining a present position of said terminal unit, said signal being demodulated from a multiplexed received signal;

input means for inputting destination information;

transmission means for transmitting the present position determining signal detected by said detection means and said destination information inputted through said input means, without performing position determining processing on said detected signal at said terminal unit, to an external processing unit which determines present position information and destination position information;

reception means for receiving said present position information at said terminal unit and said destination position information determined in said external processing unit; and output means for combining said present position information and said destination position information received by said reception means by superimposing said present position information and said destination position information on map information and for outputting the combination result.

18. A terminal unit as defined in claim 17, wherein said output means combines a present position and a destination position received by said reception means with map information with a scale allowing simultaneous output of said present position and said destination position and outputs the combination result.

19. A terminal unit as defined in claim 17, wherein said said destination position information includes a direction of said destination position from the present position.

20. A position display method comprising the steps of:

detecting a signal at a terminal unit to be used for determining a present position of said terminal unit, said signal being demodulated from a multiplexed received signal;

inputting destination information;

transmitting the detected present position determining signal and said input destination information without performing position determining processing on said detected present position determining signal at said terminal unit to an external processing unit which determines present position information and destination position information;

receiving said present position information at said terminal unit and said destination position information determined in said external processing unit;

combining said received present position information and said received destination position information by superimposing said present position information and said destination position information on map information; and outputting the combined result.

21. The position display method of claim 20, wherein said received present position information and said received destination position information are combined with map information with a scale allowing simultaneous output thereof.

22. The position display method of claim 20, wherein said destination position information includes a direction of said destination position from the present position.

23. A storage medium positioned within a terminal unit, said storage medium having one or more instructions stored therein, said instructions comprising:

an instruction for causing said terminal unit to detect a signal to be used for determining a present position of said terminal unit, said signal being demodulated from a multiplexed received signal;

an instruction for causing said terminal unit to transmit said detected signal without performing position determination processing on said detected signal at said terminal unit to an external processing unit positioned apart from said terminal unit which determines the present position of said terminal unit;

an instruction for causing said terminal unit to receive position information on the present position of said terminal unit determined in said external processing unit;

an instruction for causing said terminal unit to combine the received position information and map information by indicating the position information superimposed on said map information; and an instruction for causing said terminal unit to output the combined result.

24. The storage medium of claim 23, wherein said storage medium is of a removable type.

25. The storage medium of claim 23, wherein said storage medium is of an embedded type.

26. The storage medium of claim 23, further comprising an instruction for causing said terminal input to receive said map information from said external processing unit.

27. The storage medium of claim 23, further comprising an instruction for causing said terminal unit to detect an azimuth of said terminal unit.

28. The storage medium of claim 23, further comprising an instruction for causing said terminal unit to transmit said detected signal to said external processing unit and to transmit said position information to said terminal unit through a base station comprising a portion of a radiocommunication system.

29. The storage medium of claim 28, further comprising an instruction for causing said terminal unit to detect an identification number of said base station as said signal to be detected at the terminal unit for determining the present position of the terminal unit.

30. The storage medium of claim 23, further comprising an instruction for causing said terminal unit to transmit said detected signal to said external processing unit and to receive said position information from said external processing unit through a base station comprising a portion of a telephone system.

31. The storage medium of claim 23, further comprising an instruction for causing said terminal unit to detect a radio wave from a satellite as said signal to be detected at said terminal unit for determining the present position of the terminal unit.

32. The storage medium of claim 23, further comprising an instruction for causing said terminal unit to detect a radio wave from a beacon that transmits traffic information as said signal to be detected at the terminal unit for detecting the position of the terminal unit.

33. A storage medium positioned within a terminal unit, said storage medium having one or more instructions stored therein, said instructions comprising:

an instruction for causing said terminal unit to detect a signal to be used for determining a present position of said terminal unit, said signal being demodulated from a multiplexed received signal;

an instruction for causing said terminal unit to accept input destination information;

an instruction for causing said terminal unit to transmit the detected present position determining signal and said input destination information without performing position determining processing on said detected present position determining signal at said terminal unit, to an external processing unit which determines present position information and destination position information;

an instruction for causing said terminal unit to receive said present position information at said terminal unit and said destination position information determined in said external processing unit;

an instruction for causing said terminal unit to combine said received present position information and said received destination position information by superimposing said present position information and said destination position information on map information; and an instruction for causing said terminal unit to output said combined result.

34. The storage medium of claim 33, further comprising an instruction for causing said terminal unit to combine said received present position information and sake received destination position information with map information with a scale allowing simultaneous output thereof.

35. The storage medium of claim 33, wherein said destination position information includes a direction of said destination position from the present.

* * * * *